350-3.6 SR

XR 3,541,238

EARCH ROOM (2)

SUBSTITUTE FOR MISSING XR

REAL TIME THREE DIMENSIONAL TELEVISION SYSTEM UTILIZING WAVE FRONT RECONSTRUCTION TECHNIQUES

Filed Nov. 29, 1968 3 Sheets-Sheet 1

INVENTORS L. H. ENLOE
W. C. JAKES, JR.
C. B. RUBINSTEIN
BY John K. Mullarney
ATTORNEY

United States Patent Office 3,541,238
Patented Nov. 17, 1970

3,541,238

REAL TIME THREE DIMENSIONAL TELEVISION SYSTEM UTILIZING WAVE FRONT RECONSTRUCTION TECHNIQUES

Louis H. Enloe, Colts Neck, William C. Jakes, Jr., Rumson, and Charles B. Rubinstein, Colts Neck, N.J., assignors to Bell Telephone Laboratories, Incorporated, Murray Hill and Berkeley Heights, N.J., a corporation of New York Continuation-in-part of application Ser. No. 662,325, Aug. 22, 1967. This application Nov. 29, 1968, Ser. No. 779,844
Int. Cl. H04n 9/54
U.S. Cl. 178—6.5 6 Claims

ABSTRACT OF THE DISCLOSURE

This disclosure relates to a television system that utilizes wave front reconstruction techniques (i.e., holography) to provide a real time, three dimensional image at the receiving end of the system, with the image changing in perspective as the object and/or observer moves. The coherent light from a plurality of laser sources is used to illuminate an object scene. The respective laser sources are positioned at widely different angles for illumination purposes. The light reflected from the object scene impinges on a photodetector while a narrow reference beam of coherent light raster scans the photodetector to thereby generate a signal which is modulated in phase and amplitude in accordance with the heterodyning of the object reflected and reference beams on the photodetector. The instantaneous phase difference between each of the coherent light signals from said plurality of laser sources and the reference beam signal is locked by phase-lock loop techniques to the instantaneous phase of a signal from a radio frequency reference oscillator. The carrier frequency of the modulated signal from the photodetector is thus equal to the frequency of the radio frequency reference oscillator, which is chosen to be an integral multiple of the frame repetition rate. The signals carrying the hologram information, and interspersed sync pulses, are then transmitted to a remote receiver. At the receiving end, the holographic signals are impinged on a video display surface by an electron beam using conventional television techniques. After each frame of the latter signals are so impinged, a coherent light source is pulsed with the light therefrom directed toward the written frame of holographic information. In this manner, an instantaneous image of the original object is obtained at the receiver. The described operation is continuously carried out a frame at a time.

CROSS REFERENCE TO RELATED APPLICATION

This application is a continuation-in-part of our copending application Ser. No. 662,325, filed Aug. 22, 1967 now abandoned.

BACKGROUND OF THE INVENTION

This invention relates to television systems and, more particularly, to a television system utilizing wave front reconstruction techniques (i.e., holography) to achieve a real time, three dimensional display at a remote receiver.

Television systems for reproducing at a remote receiver location an image of the object or scene viewed by a "camera" tube at the transmitter location are, of course, well known and in wide usage today. However, the receiver image is typically only two dimensional.

The wave front reconstruction process or holography, apparently first proposed by Dennis Gabor of the Imperial College of Science and Technology in London, has been used successfully to produce three dimensional photographic pictures that have a surprising realism. As is explained, for example, in the article by Leith and Upatnicks entitled "Photography by Laser," Scientific American, volume 212, No. 6, page 24, June 1965, a hologram is a photographic recording of light wave patterns which are formed by the interference of a reference light beam with light reflected from an object. A hologram differs from a conventional photographic transparency in that light wave patterns representing an image, rather than the image itself, are recorded on the photographic medium. When the hologram is then illuminated by coherent light, an image of the original object or scene is projected from the hologram which is visually perceivable, in three dimensions, as the object or scene itself.

It is the purpose of the present invention to utilize the essential principles of holography in a television system to provide a real time, three dimensional image of the object or scene at the receiving end of the system.

Theoretically, holographic phototransparencies can be transmitted electrically by facsimile or television techniques just like any other photographic record. For example, holographic phototransparencies can be scanned by a camera tube at the transmitter location and the generated electrical signals can be transmitted to a remote receiver location. The holographic transparencies are then reconstructed at the remote receiver to provide an image of the original object or scene. Unfortunately, however, practical television camera tubes are invariably devices of rather limited resolution, and are not at all well suited to transducing photographic records such as holograms.

SUMMARY OF THE INVENTION

It is accordingly a primary object of the present invention to achieve a real time, three dimensional television system.

It is a further object of the invention to provide a three dimensional television system of greatly increased resolution.

These and other objects are attained in accordance with the present invention wherein the coherent light from a plurality of laser sources is used to illuminate an object or scene. The respective laser sources are positioned at widely different angles thus assuring a more complete illumination of the object and the various facets thereof; particular facets of a given object may not necessarily be illuminated by coherent light when only a single laser source is used for illumination purposes. The light reflected from the object or scene impinges on a photodetection plate (e.g. a photomultiplier or equivalent photodetector) while a narrow reference beam of coherent light derived from another laser source scans, in a raster manner relative to the object reflected light, the photodetection plate. The photodetector thereby generates a signal which is modulated in phase and amplitude in accordance with the heterodyning of the object reflected and reference beams on the photodetector.

The instantaneous phase difference between each of the coherent light signals from said plurality of laser sources and the reference beam signal is locked by phase-lock loop techniques to the instantaneous phase of a signal from a radio frequency reference oscillator. The carrier frequency of the modulated signal from the photodetector is thus equal to the frequency of the radio frequency reference oscillator, which is chosen to be an integral multiple of the frame repetition rate.

The aforementioned modulated signal is transmitted to a remote receiver where the holographic information contained in said modulated signal is displayed, a frame at a time, using known display techniques. In this manner, instantaneous images of the original object or scene are continuously obtained at the receiver at a selected frame repetition rate (e.g. 30 or more frames per second).

A feature of the invention is that the use of separate object and reference beam sources of different frequencies permits the average angle between the reflected light beam from the object and the reference beam, impinging on the photodetector, to be reduced to substantially zero thus reducing the resolution requirements of the scanning beam.

DETAILED DESCRIPTION

Figure 1A:
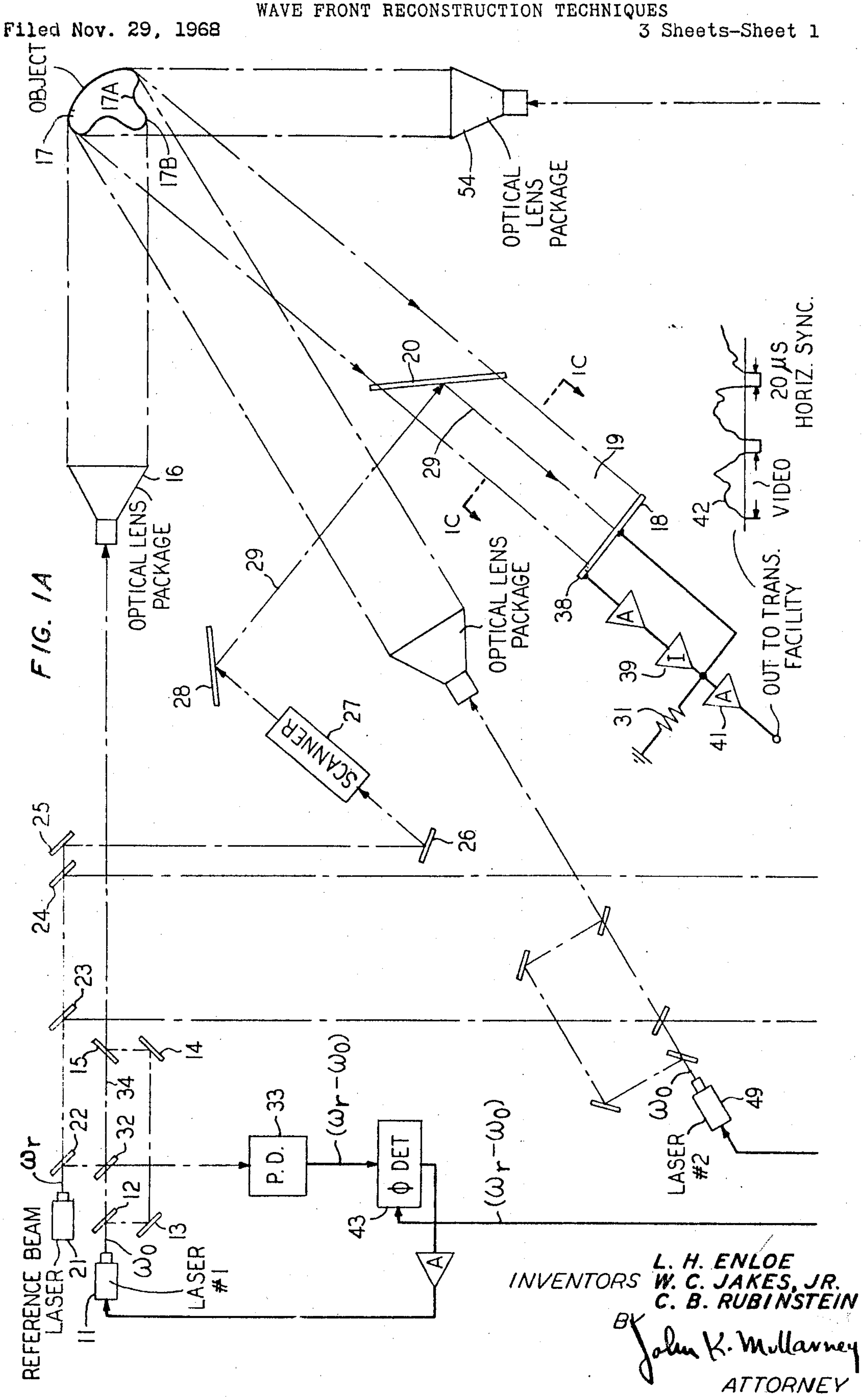
FIGS. 1A and 1B when placed top to bottom show a simplified schematic block diagram of a transmitting terminal of a television system in accordance with the present invention.
Figure 1B:
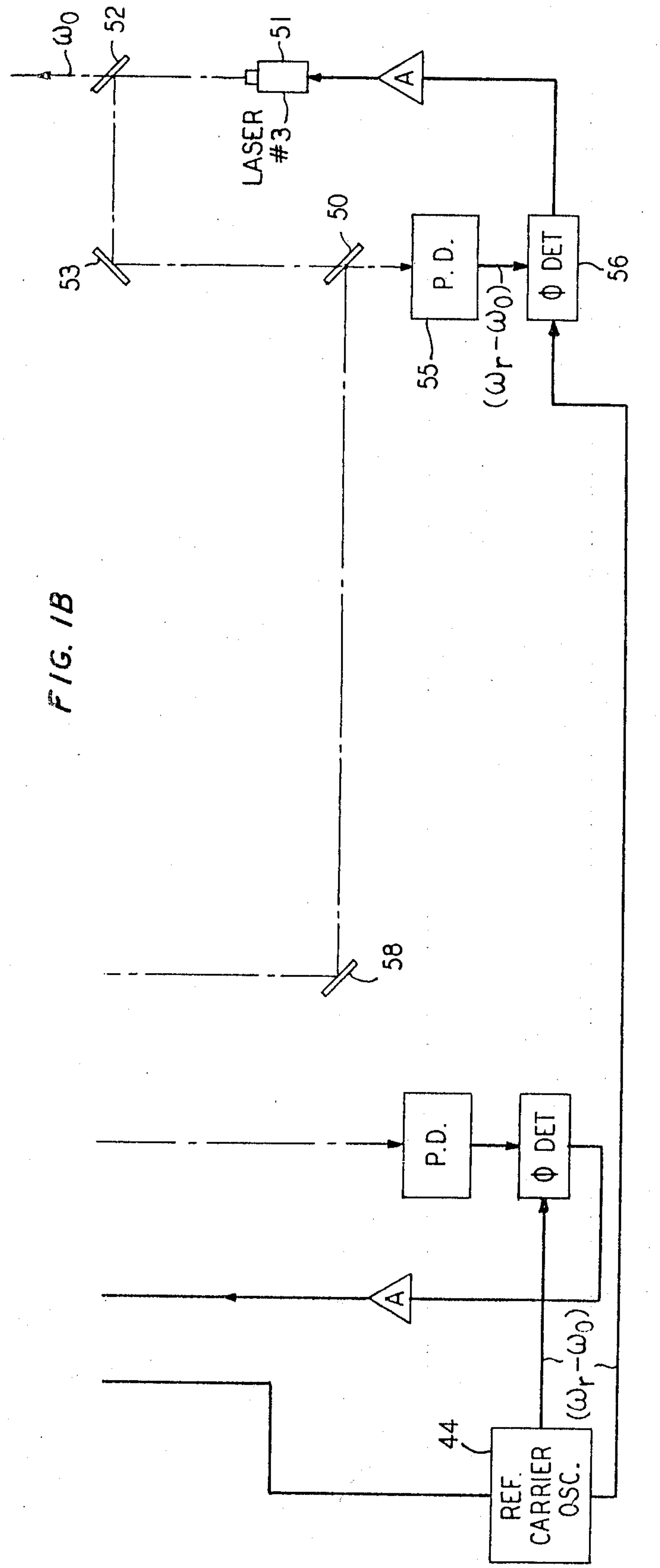

Referring now to the drawings, FIGS. 1A and 1B show in simplified schematic form the transmitting apparatus for making a composite transmitting signal comprising the holographic information related to the object or scene and the requisite horizontal and vertical synchronization pulses. This apparatus comprises a first source 11 of monochromatic coherent light such as a laser, a partially reflecting mirror 12, fully reflecting mirrors 13, 14 and 15 and an optical lens package 16. The mirror 12, as well as other partially reflecting mirrors located at the transmitter, are designed to transmit therethrough part of the impinging coherent light, while reflecting part. Since the light beam from the laser is dimensionally small (e.g. a diameter of approximately 2 millimeters) a series of lenses (i.e., lens package 16) is utilized to spread this light beam so that all of the object 17 immediately facing lens package 16 is fully illuminated. In this regard, it should be noted that the portion or surface of the object designated 17*a* in FIG. 1A will not be illuminated by the coherent light from laser 11 since the portion 17*b* of the object serves to obstruct the same. This matter will be further considered hereinafter. When the coherent light from source 11 is reflected from object 17, part of it impinges on the photodetection plate or array 18, as shown by the light beam path 19. The schematically illustrated photodetector 18 may comprise the plate of a conventional photomultiplier tube, an array of photodetector diodes or any other device known in the art which takes impinging light rays and converts the same to electrical signal current, or voltage.

Simultaneously, the coherent light from the reference beam laser 21 is partially reflected by the respective mirrors 22, 23, and 24, for a purpose to be described, with the remainder directed to the scanner 27 via the fully reflecting mirrors 25 and 26. The light beam output of scanner 27 is reflected once again by beam-splitter 20 and then reflected by mirror 28, impinges on the photodetector plate or array 18, as shown by the light beam path 29. The light reflected from mirror 28 and beam-splitter 20 maintains its coherency and substantially its same general characteristics. On the other hand, the light reflected from the irregular object is diffuse and has irregular wave fronts although this reflected light is nevertheless temporarily coherent and monochromatic.

Disregarding for the moment the function and purpose of the scanner 27, it is known to those in the holography art that when two light beams such as 19 and 29 reach the plate 18, they will interfere constructively and destructively. At those locations at which the two light components add in phase, they will illuminate the plate to a greater extent than at those locations at which the two components are out of phase and are therefore mutually destructive. Now if the plate 18 were a photographic transparency, a hologram recording such as shown and described in the article by Leith and Upatnicks would be obtained. And as further explained in said article, an image of the object 17 may later be reconstructed from the hologram recording by properly illuminating the hologram with a reference beam of coherent light corresponding to the original reference beam.

The scanner 27 serves the purpose of scanning the reference beam, in a raster type manner, over the photodetector 18. Accordingly, a point-like reference beam (i.e., on the order of 10 microns) is caused to scan horizontally across the width of the photodetector 18 and then snap back to the starting edge and begin a second horizontal scan somewhat below the first horizontal scan. This process is continuously carried out until the entire photodetection plate has been so scanned, and the process is then repeated. As the scanned beam and the object light beam interfere constructively and destructively with each other in the manner described a corresponding current will be developed across the output resistance 31, which current will comprise a carrier that is modulated in phase and amplitude in accordance with the interference or holographic pattern generated by the interfering beams of light. The carrier frequency can be controlled by the angle between the object and reference beams, or alternatively by using a non-zero value for the instantaneous frequency difference between the two beams. In order to obtain identical hologram patterns at the receiver for successive frames, the carrier frequency should be an integral multiple of the frame repetition rate.

To generate a suitable signal, modulated as described, the aperture defined by the waist of the reference beam must be sufficiently small so as to resolve the highest spatial frequency of the object beam. And a small waist or aperture corresponds, of course, to a large cone angle of convergence. Now if the object should appear to lie outside this cone of convergence, the aperture of the scanning beam will prove too large to resolve the highest spatial frequency of the object beam. Thus, as will be apparent, the object should preferably appear to fall or lie within the aforementioned cone of convergence. This can be most readily accomplished by the use of a conventional beam splitter 20 positioned as shown in FIG. 1A of the drawings. Looking from the photodetector surface, the object will appear to lie within the cone of convergence of the reference beam, assuming of course an adequate cone angle as described above, and yet the object in no way obscures any part of the reference beam, or vice versa. This cone of convergence has not been illustrated in the drawing since the same will be readily appreciated by those in the art.

The beam splitter 20, which brings the two incident beams into the desired condition of overlap, is of the conventional type, i.e., it serves to transmit or pass approximately half of the incident light while reflecting the remaining half.

The aforementioned scanning may be carried out mechanically with rotating optical mirrors or by various electro-optical arrangements known in the art. Accordingly, the invention should in no way be construed as limited to any particular known method for scanning the reference beam 29 over the photodetection plate 18. The simplest scanning technique is, of course, a sequential line-by-line scan; however, interlaced scanning is also feasible and the invention is in no way limited to the particular type scan utilized.

The scanner 27 is placed, as described, in the reference beam path to effect a raster scan of the latter relative to the object reflected light. Precisely the same output electrical signal can be obtained, however, by scanning the object reflected beam with respect to a stationary reference beam. For example, the scanner 27 can be eliminated and the point-like reference beam 29 expanded, by an optical lens package (not shown), so as to fully illuminate the photodetector 18. An opaque plate (not shown) having a pinhole aperture is next disposed intermediate the object 17 and the beam splitter 20 and the pinhole aperture is mechanically moved or scanned in a raster fashion in the same way as the electron beam in a camera tube. This relative movement of the object beam with respect to the reference beam will similarly develop an output current which comprises a carrier that is modulated in phase and amplitude in accordance with the interference pattern generated by the heterodyning beams of light. As a practical matter the use of an optical scanner in the reference beam path appears at present to be the more desirable manner of obtaining the relative scan of the two beams. However, the present invention is conceptually in no manner limited thereto.

Figure 1C:
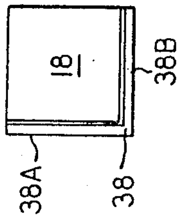
FIG. 1C is a view of the photodetector arrangement as viewed from the line 1C—1C of FIG. 1A.

The partially reflecting mirrors 22 and 32 are required to direct a respective portion of the reference beam and a respective portion of the object beam to the photodetector 33 for a purpose to be described. The partially reflecting mirror 32 passes half of the object beam from laser 11 and reflects the other half to photodetector 33. The mirror 32 also passes part of the incident reference beam to photodetector 33 while, unfortunately, reflecting the other part of the reference beam toward the object 17. This is undesirable and must be precluded. To this end, the fully reflecting mirrors 13, 14, and 15 are utilized to direct the object beam to the lens package 16, as shown in FIG. 1, while precluding the reference beam. The mirror 15 has an opaque backing, as most all fully reflecting mirrors, and hence all light traversing the path 34 is blocked. The combination of mirrors 13, 14, and 15, however, insures the transmission of the object light beam from source 11 to the lens package 16.

An attractive alternative would be to place a photodetector in path 34. The signal output of this photodetector would be identical but 180° out of phase with the output of photodetector 33. Hence, by inverting the output of the photodetector added in path 34 and adding it to the output of 33, a balanced detector is obtained. The use of the mirrors 13, 14, and 15 could then be dispensed with.

Alternatively, if the light beams from the lasers 11 and 21 are sufficiently removed in frequency an optical filter (not shown) of the Fabry-Perot type can be inserted in the path 34 to eliminate the reference beam while passing the object beam from laser 11. The use of mirrors 13, 14, and 15 can then be dispensed with.

A second photodetection means 38, similar to the plate 18, is located adjacent to the photodetection plate 18 for the purpose of generating the horizontal and vertical sync pulses. As shown more specifically in FIG. 1C, the photodetector 38 is L-shaped and separated from plate 18 by an air space or a thin strip of insulating material. As the reference beam 29 is horizontally swept from left to right, across the photodetection devices shown in FIG. 1C, a horizontal sync pulse is first generated as the reference beam is swept across the section 38A of the photodetection means 38. As the horizontal sweep then continues across plate 18, the aforementioned holographic information is generated. This occurs with each horizontal sweep. The last horizontal sweep of the reference beam is across the section 38B of photodetection means 38 and this generates the requisite, relatively wide (i.e., with respect to horizontal sync pulses), vertical sync pulses. The scanned beam then returns to the initial starting point for the next frame sweep.

The output current signals from the photodetection means 38 is amplified, inverted in inverter 39, and then delivered to the output resistance 31. The signals carrying the holographic information and interspersed sync pulses are amplified in amplifier 41 and delivered to a transmission facility such as a coaxial cable or a radio relay system. The composite output signal, minus the carrier, is partially illustrated at 42 in FIG. 1A. The video is, of course, the holographic information carrying signal developed by the scan across plate 18 and the horizontal sync pulses are interspersed, as shown, and of reverse polarity.

The laser sources 11 and 21 operate at different nominal frequencies. The use of separate object and reference beam sources of different frequencies permits the average angle between the reflected light beam from the object and the reference beam, impinging on the photodetector 18, to be reduced to substantially zero thus reducing the resolution requirements of the scanning beam. The use of separate object and reference beam sources of different frequencies permits a trade-off between the average angle of incidence of the respective beams and resolution requirements. This offers increased flexibility to the system designer.

As is known to those in the art, lasers tend to run somewhat erratically, e.g. ±20 megacycles about their nominal frequency. In the present embodiment such erratic behavior could result in an undesirable, nonuniform diffraction grating. For this reason, the frequency ($\omega_0$) of the coherent light from laser source 11 is in effect "phase-locked" to the frequency ($\omega_r$) of the coherent light from the reference beam laser 21 in a manner to be described.

The coherent light output from the reference beam laser 21 is partially reflected by mirror 22, partially passed by mirror 32, and thence delivered to the photodetector 33 of a "phase-locked" loop. The coherent light of laser source 11, that is partially passed by mirror 12, is partially reflected by mirror 32 so as to also impinge on the photodetector 33. The photodetector 33 can be of the same nature as photodetector 18. The output of photodetector 33 comprises a carrier signal having a frequency of ($\omega_r - \omega_0$) and which is modulated in phase in accordance with the phase variations between the incident beams. The power output of the lasers 11 and 21 is substantially constant and hence the above-mentioned carrier signal is amplitude modulated to a negligible extent.

The output of the photodetector 33 is delivered to a phase detector 43 which compares the aforementioned phase variations against the reference signal ($\omega_r - \omega_0$) from the reference carrier oscillator 44. The detector 43 may comprise any state of the art phase detection circuit which compares the instantaneous phase of the two input signals thereto and in response to this comparison produces an output signal which is proportional to the varying instantaneous phase difference between the two input signals. The output signal from phase detector 43 is amplified and delivered as an error correcting signal to the laser source 11 to adjust the phase and frequency thereof so that it effectively tracks the phase and frequency shifts in the reference laser source 21.

In accordance with the present invention the coherent light from a plurality of laser sources is used to illuminate an object or scene. The respective laser sources are positioned at widely different angles thereby assuring a more complete illumination of the object and the various facets or surfaces thereof. As noted, particular facets or surfaces of a given object may not necessarily be illuminated by coherent light when only a single laser source is utilized. For example, the laser source 11 fails to illuminate the surface 17*a* of the object 17 because of the presence of the intervening protuberance 17*b* of object 17. This is immaterial, however, since the surface 17*a* is well illuminated by laser source 51. The embodiment shown in FIGS. 1A and 1B uses three separate lasers to illuminate the object. It should be apparent, however, that any selected number of lasers can be used and these can be located at any desired angle with respect to each other and to the object. The number of lasers used and their angular dispositions or locations will be determined by the configuration of the object to be illuminated and the inclinations of the user. Furthermore, for the same reasons that a 100 watt bulb more clearly sets forth the objects in a room than a 5 watt bulb, the use of a plurality of laser sources (e.g. sources #1, #2, and #3) more clearly delineates the object 17 and its various facets or surfaces.

Each of the laser sources 49 and 51 and the respective apparatus associated therewith corresponds to laser source 11 and its related apparatus. For example, each object directed laser source operates at a frequency of $\omega_0$ and each is provided with a respective phase-locked loop.

Since the lasers 49 and 51 and their respective related apparatus are similar to laser 11 and its related apparatus, only laser 51 and its associated equipment will be considered briefly herein. Part of the coherent light from laser source 51 will be passed by the partially reflecting mirror 52, while the other part is reflected to the fully reflecting mirror 53. The light passed by mirror 52 is delivered to the optical lens package 54 where it is spread out so as to more fully illuminate the object 17. The coherent light derived from source 51 is reflected from the object 17 and part of the same impinges on the photodetector 18 where it heterodynes with the scanned reference beam in the same fashion as heretofore described.

The coherent light reflected from mirror 52 is further reflected by mirror 53 and then passed by the partially reflecting mirror 50 to the photodetector 55. A portion of the coherent light from the reference laser source 21 is reflected from the partially reflecting mirror 24 and thence reflected from the fully reflecting mirror 58 and the partially reflecting mirror 50 to the photodetector 55. The phase-locked loop associated with laser 51 is structurally and functionally identical to the phase-locked loop associated with laser 11 and hence further discussion of the same is not believed warranted. The reference carrier oscillator 44 serves to deliver the same signal (of frequency $\omega_r - \omega_0$) to each phase detector of each phase-locked loop. Thus, in the same manner as previously described, the phase detector 56 delivers an error correcting signal to the laser 51 to adjust the phase and frequency thereof.

Figure 2:
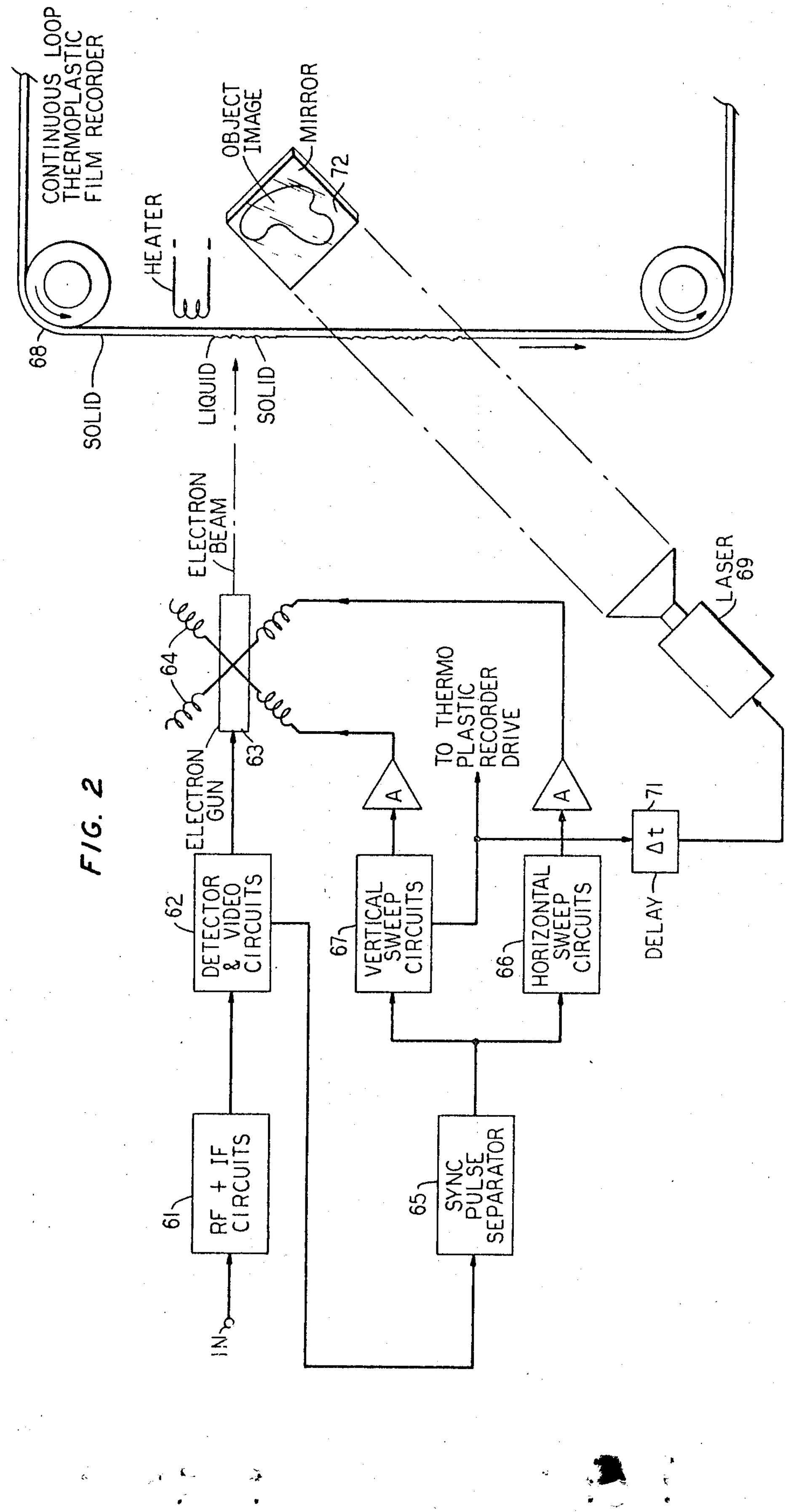
FIG. 2 illustrates a simplified schematic diagram, partly in block form, of a typical television receiver that can be utilized in conjunction with the transmitting terminal of the present invention.

Turning now to FIG. 2 of the drawings, a typical receiver that can be utilized in conjunction with the transmitting terminal of the present invention is shown to comprise input R.F. and I.F. circuits 61, detector and video circuits 62, an electron gun and deflection coils 63 and 64, respectively, a sync pulse separator 65 which separates the horizontal and vertical sync pulses from the incoming signal and from each other (relying on their respective time durations), and horizontal and vertical deflection sweep circuits 66 and 67, respectively. The above-enumerated circuitry is conventional to television systems in general and has been extensively described in the literature; see, for example, "Television Standards and Practice," edited by D. M. Fink, McGraw-Hill Book Co., Inc. (1943) and "Electronic and Radio Engineering" by F. E. Terman, McGraw-Hill Book Co., Inc. (1955), Fourth Edition, page 991 et seq.

The electron beam from the electron gun 63 is modulated in intensity in accordance with the received holographic information signals. The sweep signals delivered to the deflection coils 64 from the horizontal and vertical sweep circuits cause this beam to be swept in a raster type manner over the video display thermoplastic tape 68. Thermoplastic tape has been used extensively for video display purposes and the same is thoroughly described in the literature; see, for example, the article entitled "Thermoplastic Recording Tape Systems" by Norman Kirk, Journal of the Society of Motion Picture and Television Engineers (SMPTE), volume 74, August 1965, pages 666–668, and the patents and publications cited therein.

After each successive frame of the holographic information has been written on the thermoplastic tape display surface, and energizing pulse signal is delivered from the vertical sweep generator 67 to the thermoplastic film recorder drive system (not shown), and to the laser source 69 via the time delay 71. Continuous loop thermoplastic film recorders are well known in the art and therefore need not be described in detail herein; see the article entitled "Thermoplastic Recording: A Progress Report," by W. E. Glenn, Journal of SMPTE, volume 74, August 1965, pages 663–665. As pointed out in the above article the tape can be erased, after being used for its intended purpose, and then reused in a continuous manner. As further pointed out in the above-cited articles in the Journal of the SMPTE, movement of the tape can be continuous or intermittent. In a "continuous-motion transport" the electron beams scans the thermoplastic tape surface horizontally while the tape motion past the recording zone provides the vertical scan. Alternatively, the beam can be electronically scanned in the horizontal and vertical and after a complete frame has been so scanned the tape is moved rapidly during the flyback period and then a new frame scan begins on the next unused section of the tape. The latter arrangement, termed "intermittent-motion transport," is illustrated in the embodiment shown in FIG. 2. However, it will be realized by those in the art that the continuous-motion transport can just as readily be used herein.

After a complete frame of holographic information has been written as described, the tape is moved rapidly, for the next electron beam writing operation, in response to a pulse signal initiated at the beginning of the vertical fly-back period. The coherent light source, laser 69, is then pulsed after a short delay with the light therefrom directed toward the just-written frame of holographic information. The short delay is for the purpose of assuring that the tape is completely stationary prior to the pulsing of the laser source 69.

When the laser is momentarily pulsed, an instantaneous image of the original object or scene is obtained and the same is projected on the mirror 72. The mirror 72 is positioned, as illustrated, so that it reflects the instantaneous image at a right angle out of the plane of the paper and toward an observer appropriately positioned.

The above-described operation is carried out at the receiver a frame at a time and thereby presents to an observer a real time, three dimensional image of the original object or scene. The operation is carried out at a sufficiently high rate (e.g. 30 or more frames per second) to present a continuous picture to an observer.

The receiver display system described is intended to be illustrative only. For example, the well known "Swiss Eidophor" display system can be readily used in place of the thermoplastic tape recorder shown in FIG. 2. In this system, the video signal is used to modulate an electron beam which is being scanned over an oil film in a raster pattern. The oil film rests on a glass substrate whose opposite surface is coated with a conductive material. The electron beam deposits a charge on the oil film which is proportional to the video signal amplitude. A potential applied between the oil film and the conductive coating introduces electrostatic forces which deform the oil film in accordance with the charge pattern. Thus, recording is accomplished in this case as a thickness variatiton; see the article entitled "The Fisher Large-Screen Projection System (Eidophor)," by E. Baumann, Journal of the SMPTE, volume 60, April 1953, pages 344–356. Accordingly, it is to be understood that the above-described embodiment is merely illustrative of the principles of the present invention and that numerous modifications or alterations may be made therein without departing from the spirit and scope of the present invention.

What is claimed is:

1. In a real time three dimensional television system having a transmitter, one or more remote receivers and a transmission facility for sending signals generated at the transmitter to said remote receivers, a plurality of sources of coherent light located at the transmitter, means for illuminating an object scene with the coherent light derived from the respective sources, the coherent light sources being positioned at widely different angles with respect to the object scene, photodetection means positioned to receive a portion of the light reflected from said object scene, another source of coherent light providing a reference beam, means for relatively scanning the reference beam with respect to the light reflected from said object scene in a raster type manner over the photodetection means to generate an alternating current signal which is modulated in phase and amplitude in accordance with the heterodyning of the object reflected and reference light beams impinging on the photodetection means, and means for phase locking the instantaneous phase difference between the coherent light from said plurality of sources and that from the reference beam to a signal from a radio frequency source having a frequency which is an integral multiple of the frame repetition rate.

2. A system in accordance with claim 1 wherein said generated alternating current signal has a carrier frequency equal to the frequency difference between the frequency of the reference beam and the frequency of the coherent light from said plurality of sources and which is an integral multiple of the frame repetition rate.

3. A system in accordance with claim 2 wherein the reference beam is exceedingly narrow in diameter and is scanned in a raster type manner over the surface of said photodetection means.

4. A system in accordance with claim 3 wherein the scanned reference beam is of the order of several microns in diameter.

5. A system in accordance with claim 4 wherein the photodetection means comprises a photomultiplier tube having a photosensitive plate on which the coherent light reflected from said object and the reference beam are caused to impinge.

6. A system in accordance with claim 2 wherein a phase locking means is associated with each of said plurality of sources, each phase locking means comprising a photodetector to which a portion of the reference beam and a portion of the coherent light of the associated object illuminating source is directed, said photodetector serving to generate a signal having a carrier equal to the frequency difference between the light beams incident thereto and which is modulated in phase in proportion to the phase variations between the incident beams, a phase detector receiving the output of said photodetector and serving to compare the phase variations of the modulated carrier signal against a reference signal derived from a reference oscillator and in response to this comparison serving to produce an output signal which is proportioned to the varying phase and frequency difference between the two input signals thereto, and means for coupling the output of said phase detector to the associated object illuminating source for the purpose of adjusting the phase and frequency thereof in accordance with the phase detector output signal.

References Cited

UNITED STATES PATENTS 3,444,316 5/1969 Gerritsen ---------- 178—6.5

OTHER REFERENCES

Multicolor Holograms Viewed With White Light, Bell Labs Record, vol. 44, No. 3, March 1966, p. 103.

The Generation of Three-Dimensional Contour Maps, by Wavefront Reconstruction, Hildebrand & Haines, Physics Letters, vol. 21, No. 4, June 1966, pp. 422–423.

ROBERT L. GRIFFIN, Primary Examiner

J. A. ORSINO, Jr., Assistant Examiner

U.S. Cl. X.R.

178—6, 7.1, 7.3; 350—3.5